United States Patent [19]

Chester

[11] 4,107,032

[45] Aug. 15, 1978

[54] PROCESS FOR CRACKING HYDROCARBONS

[75] Inventor: Arthur Warren Chester, Cherry Hill Township, Camden County, N.J.

[73] Assignee: Mobil Oil Corporation, New York, N.Y.

[21] Appl. No.: 737,633

[22] Filed: Nov. 1, 1976

[51] Int. Cl.² .................... B01J 8/24; B01J 27/10; C10G 23/04
[52] U.S. Cl. .................... 208/120; 208/113; 208/121; 252/417; 252/441
[58] Field of Search ............... 208/120, 121; 252/415, 252/417

[56] References Cited

U.S. PATENT DOCUMENTS

| | | | |
|---|---|---|---|
| 3,418,256 | 12/1968 | Rigney et al. | 252/415 |
| 3,904,510 | 9/1975 | Sinfelt et al. | 208/140 |
| 3,904,548 | 9/1975 | Fagan et al. | 252/417 |
| 3,950,491 | 4/1976 | Liederman et al. | 252/415 X |
| 3,979,333 | 9/1976 | Myers | 252/141 |
| 3,986,982 | 10/1976 | Crowson et al. | 252/415 |
| 4,072,600 | 2/1978 | Schwartz | 208/120 |

FOREIGN PATENT DOCUMENTS 2,444,911  5/1975  Fed. Rep. of Germany ........... 208/120

Primary Examiner—Delbert E. Gantz
Assistant Examiner—G. E. Schmitkons
Attorney, Agent, or Firm—Charles A. Huggett; Vincent J. Frilette

[57] ABSTRACT

In a fluid catalytic cracking process for cracking hydrocarbons with a zeolitic cracking catalyst and in the absence of added hydrogen, the desired value of $CO_2/CO$ in the flue gases from the regenerator is achieved by including in the catalyst a combustion-promoter metal such as platinum, palladium, rhodium, ruthenium, iridium, osmium or rhenium, and, additionally, contacting the catalyst with a metal-free chlorine or bromine compound.

17 Claims, 3 Drawing Figures

RELATIVE OXIDATION ACTIVITY

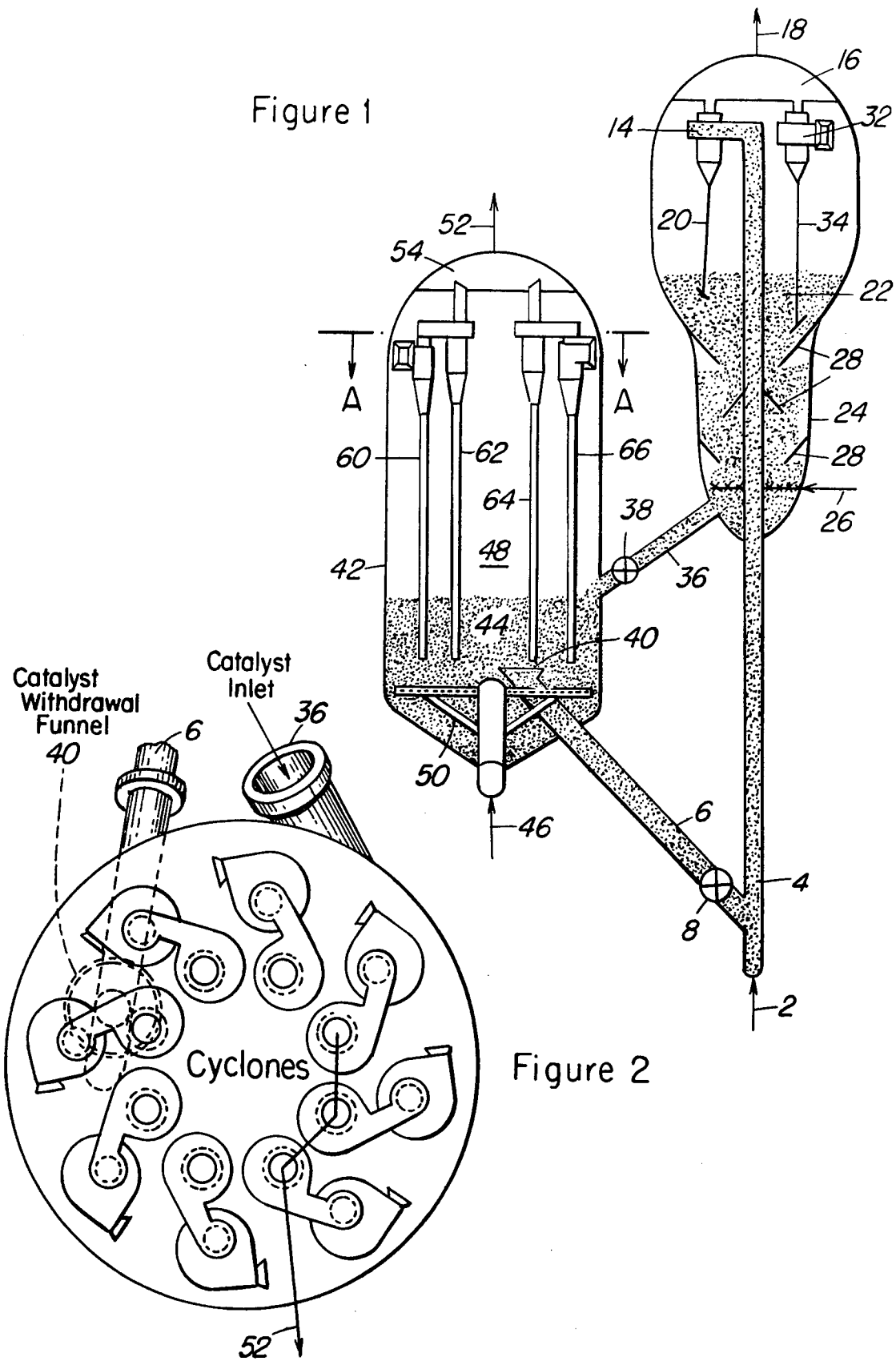

RELATIVE OXIDATION ACTIVITY

PROCESS FOR CRACKING HYDROCARBONS

BACKGROUND OF THE INVENTION

1. Field of the Invention

This invention is concerned with the catalytic cracking of hydrocarbons in the absence of added hydrogen. In particular, it is concerned with a method for sustaining or increasing the carbon monoxide combustion activity of zeolite cracking catalysts that contain, as combustion-promoter, a minute amount of metal such as platinum.

2. Description of the Prior Art

The catalytic cracking of petroleum hydrocarbons is conducted commercially on a very large scale utilizing either a moving bed process in which fairly large particles of catalyst are continuously circulated between a cracking zone and a regeneration zone, or a fluid bed process in which a much smaller particle size catalyst is circulated through the system in a fluidized state.

Since by far the most important process in current use is that in which the catalyst is fluidized, commonly referred to as fluid catalytic cracking or "FCC," the present invention will be exemplified by reference to this process although it is to be understood that it is also applicable to the moving bed process and other conceivable processes of the same type. In the fluid catalytic cracking process, the installed plants are usually designed to process from about 5,000 to 135,000 bbls/day of fresh feed. Most of the plants are quite large, and are capable of handling at least 40,000 bbls/day. The catalyst section of the plant consists of a cracking section where a heavy hydrocarbon feed is cracked in contact with fluidized cracking catalyst and a regenerator section where fluidized catalyst coked in the cracking operation is regenerated by burning with air. All of the plants utilize a large circulating inventory of cracking catalyst which is continuously circulating between the cracking and regenerator sections. The size of this circulating inventory in most existing plants is within the range of 50 to 600 tons.

BRIEF DESCRIPTION OF THE DRAWING

FIG. 1. Schematic of FCC apparatus

FIG. 2. Section view of regenerator

Figure 3:
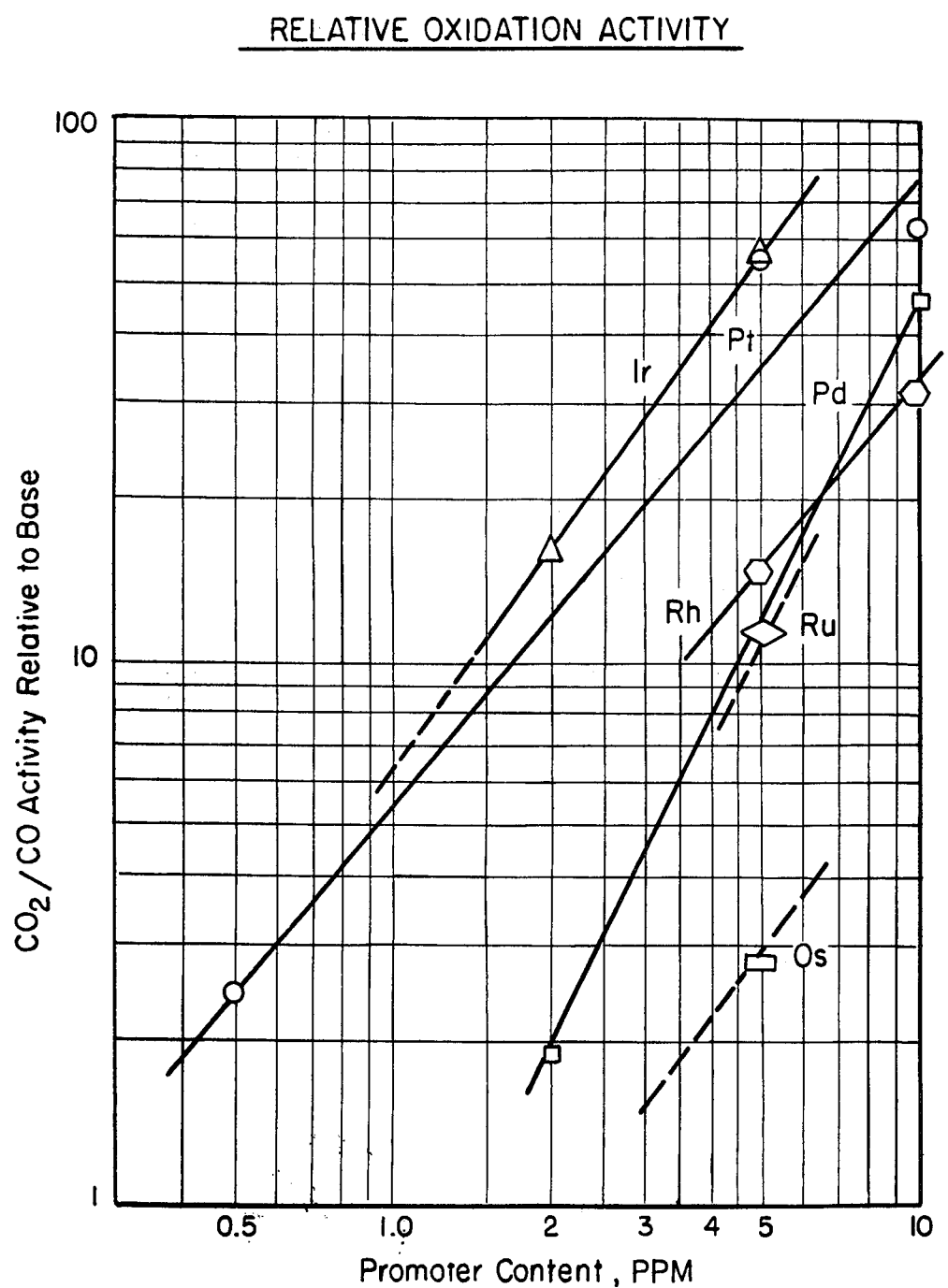
FIG. 3. Relative Activity of Combustion Promotor Metals

Although the design and construction of individual plants vary, the essential elements, particularly the flow of catalyst, is illustrated by FIGS. 1 and 2 which show a conventional catalyst section of a fluid catalytic cracking plant.

FIG. 1 and the sectional element thereof shown in FIG. 2 are representative of the catalyst section of a commercial fluid catalytic cracking unit. Referring now to FIG. 1, a hydrocarbon feed 2 such as gas oil boiling from about 600° F up to 1000° F is passed after preheating thereof to the bottom portion of riser 4 for admixture with hot regenerated catalyst introduced by standpipe 6 provided with flow control valve 8. A suspension of catalyst in hydrocarbon vapors at a temperature of at least about 950° F but more usually at least 1000° F is thus formed in the lower portion of riser 4 for flow upwardly therethrough under hydrocarbon conversion conditions. The suspension initially formed in the riser may be retained during flow through the riser for a hydrocarbon residence time in the range of 1 to 10 seconds.

The hydrocarbon vapor-catalyst suspension formed in the riser reactor is passed upwardly through riser 4 under hydrocarbon conversion conditions of at least 900° F and more usually at least 1000° F before discharge into one or more cyclonic separation zones about the riser discharge, represented by cyclone separator 14. There may be a plurality of such cyclone separator combinations comprising first and second cyclonic separation means attached to or spaced apart from the riser discharge for separating catalyst particles from hydrocarbon vapors. Separated hydrocarbon vapors are passed from separator 14 to a plenum chamber 16 for withdrawal therefrom by conduit 18. These hydrocarbon vapors together with gasiform material separated by stripping gas as defined below are passed by conduit 18 to fractionation equipment not shown. Catalyst separated from hydrocarbon vapors in the cyclonic separation means is passed by diplegs represented by dipleg 20 to a dense fluid bed of separated catalyst 22 retained about an upper portion of riser conversion zone 4. Catalyst bed 22 is maintained as a downwardly moving fluid bed of catalyst counter-current to rising gasiform material. The catalyst passes downwardly through a stripping zone 24 immediately therebelow and counter-current to rising stripping gas introduced to a lower portion thereof by conduit 26. Baffles 28 are provided in the stripping zone to improve the stripping operation.

The catalyst is maintained in stripping zone 24 for a period of time sufficient to effect a high temperature desorption of feed deposited compounds which are then carried overhead by the stripping gas. The stripping gas with desorbed hydrocarbons pass through one or more cyclonic separating means 32 wherein entrained catalyst fines are separated and returned to the catalyst bed 22 by dipleg 34. The hydrocarbon conversion zone comprising riser 4 may terminate in an upper enlarged portion of the catalyst collecting vessel with the commonly known bird cage discharge device or an open end "T" connection may be fastened to the riser discharge which is not directly connected to the cyclonic catalyst separation means. The cyclonic separation means may be spaced apart from the riser discharge so that an initial catalyst separation is effected by a change in velocity and direction of the discharged suspension so that vapors less encumbered with catalyst fines may then pass through one or more cyclonic separation means before passing to a product separation step. In any of these arrangements, gasiform materials comprising stripping gas hydrocarbon vapors and desorbed sulfur compounds are passed from the cyclonic separation means represented by separator 32 to a plenum chamber 16 for removal with hydrocarbon products of the cracking operation by conduit 18. Gasiform material comprising hydrocarbon vapors is passed by conduit 18 to a product fractionation step not shown. Hot stripped catalyst at an elevated temperature is withdrawn from a lower portion of the stripping zone by conduit 36 for transfer to a fluid bed of catalyst being regenerated in a catalyst regeneration zone. Flow control valve 38 is provided in coked catalyst conduit 36.

This type of catalyst regeneration operation is referred to as a swirl type of catalyst regeneration due to the fact that the catalyst bed tends to rotate or circumferentially circulate about the vessel's vertical axis and this motion is promoted by the tangential spent catalyst inlet to the circulating catalyst bed. Thus, the tangentially introduced catalyst at an elevated temperature is further mixed with hot regenerated catalyst or catalyst undergoing regeneration at an elevated temperature and is caused to move in a circular or swirl pattern about the regenerator's vertical axis as it also moves generally downward to a catalyst withdrawal funnel 40 (sometimes called the "bathtub") adjacent the regeneration gas distributor grid. In this catalyst rgeneration environment, it has been found that the regeneration gases comprising flue gas products of carbonaceous material combustion tend to move generally vertically upwardly through the generally horizontally moving circulating catalyst to cyclone separators positioned above the bed of catalyst in any given vertical segment. As shown in FIG. 2, the catalyst tangentially introduced to the regenerator by conduit 36 causes the catalyst to circulate in a clockwise direction in this specific embodiment. As the bed of catalyst continues its circular motion some catalyst particles move from an upper portion of the mass of catalyst particles suspended in regeneration gas downwardly therethrough to a catalyst withdrawal funnel 40 in a segment of the vessel adjacent to the catalyst inlet segment. In the regeneration zone 42 housing a mass of the circulating suspended catalyst particles 44 in upflowing oxygen containing regeneration gas introduced to the lower portion thereof by conduit distributor means 46, the density of the mass of suspended catalyst particles may be varied by the volume of regeneration gas used in any given segment or segments of the distributor grid. Generally speaking, the circulating suspended mass of catalyst particles 44 undergoing regeneration with oxygen containing gas to remove carbonaceous deposits by burning will be retained as a suspended mass of swirling catalyst particles varying in density in the direction of catalyst flow and a much less dense phase of suspended catalyst particles 48 will exist thereabove to an upper portion of the regeneration zone. Under carefully selected relatively low regeneration gas velocity conditions, a rather distinct line of demarcation may be made to exist between a dense fluid bed of suspended catalyst particles and a more dispersed suspended phase (dilute phase) of catalyst thereabove. However, as the regeneration gas velocity conditions are increased there is less of a demarcation line and the suspended catalyst passes through regions of catalyst particle density generally less than about 30 lbs. per cu. ft. A lower catalyst bed density of at least 20 lb/cu. ft. is preferred.

A segmented regeneration gas distributor grid 50 positioned in the lower cross-sectional area of the regeneration vessel 42 is provided as shown in FIG. 1 and is adapted to control the flow of regeneration gas passed to any given vertical segment of the catalyst bed thereabove. In this arrangement, it has been found that even with the generally horizontally circulating means of catalyst, the flow of regeneration gas is generally vertically upwardly through the mass of catalyst particles so that regeneration gas introduced to the catalyst bed by any given grid segment or portion thereof may be controlled by grid openings made available and the air flow rate thereto. Thus, oxygen containing combustion gases after contact with catalyst in the regeneration zone are separated from entrained catalyst particles by the cyclonic means provided and vertically spaced thereabove. The cyclone combinations diagrammatically represented in FIG. 1 are intended to correspond to that represented in FIG. 2. Catalyst particles separated from the flue gases passing through the cyclones are returned to the mass of catalyst therebelow by the plurality of provided catalyst diplegs.

As mentioned above, regenerated catalyst withdrawn by funnel 40 is conveyed by standpipe 6 to the hydrocarbon conversion riser 4.

It is generally known that the combustion gases formed in the dense bed of a regenerator, such as dense bed 44 of FIG. 1, contain a substantial concentration of carbon monoxide along with carbon dioxide. In fact, a typical $CO_2/CO$ ratio is about 1.2. In some cases the $CO_2/CO$ ratio of the flue gas discharged is somewhat higher, e.g. 1.5-2.0, due to "after-burning," a term used to describe further combustion of CO with residual oxygen in the dilute phase 48, in the cyclones or in the plenum of the regenerator. The values recited for the $CO_2/CO$ ratio are obtained with cracking catalyst not promoted for CO oxidation.

It will be clear from FIG. 1 that the term "circulating inventory of catalyst" referred to herein includes the catalyst in riser 4, in the dense bed 22, in the dense bed in stripper 24, and in the dense bed in the regenerator 44 as well as the catalyst material in lines 36 and 6 and the catalyst material suspended in dilute phase and cyclones in the reactor section and the regenerator section. This circulating inventory is everywhere very hot, substantially above about 600° F, since the regenerator operates at a temperature higher than about 1000° F, usually in the range of about 1050° F to about 1250° F, and the reactor at higher than 800° F.

In actual operation, because the catalytic activity of the circulating inventory of catalyst tends to decrease with age, fresh makeup catalyst usually amounting to about one to two percent of the circulating inventory is added per day to maintain optimal catalyst activity, with daily withdrawal plus losses of about like amount of aged circulating inventory. This catalyst makeup is usually added via a hopper and conduit (not shown) into the regenerator.

The oils fed to this process are principally the petroleum distillates commonly known as gas oils, which boil in the temperature range of about 650° F to 1000° F, supplemented at times by coker gas oil, vacuum tower overhead, etc. These oils generally are substantially free of metal contaminants.

The chargestock, which term herein is used to refer to the total fresh feed made up of one or more oils, is cracked in the reactor section in a reaction zone maintained at a temperature of about 800° F to 1200° F, a pressure of about 1 to 5 atmospheres, and with a usual residence time for the oil of from about 1 to 10 seconds with a modern short contact time riser design. The catalyst residence time is from about 1 to 15 seconds.

Because the chargestock contains trace amounts of metal, principally nickel and vanadium, the circulating inventory of catalyst accumulates these metals until a balance is struck between the metals removed from the inventory by catalyst withdrawal and losses, and the amount introduced with fresh feed. It is common to refer to circulating inventory of catalyst which has been in use for some time and has acquired a normal complement of nickel and vanadium as "equilibrium catalyst." Equilibrium catalyst usually is characterized by metals content in the range of about 200 to about 600 ppm Nickel Equivalents of metal, which is defined as ppm Nickel Equivalent = ppm nickel + 0.25 ppm vanadium It has recently been disclosed that the operation of the fluid catalytic cracking process is remarkably benefited by the inclusion in the cracking catalyst of a minute amount of combustion-promoter metal selected from the group consisting of Platinum, Palladium, Rhodium, Ruthenium, Iridium, Osmium, and Rhenium. The cracking process utilizing such promoted catalyst is described in copending U.S. patent application Ser. No. 649,261 filed Jan. 15, 1976, (now U.S. Pat. No. 4,072,600) the entire contents of which are incorporated herein by reference. Incorporating the combustion-promoter metal in the cracking catalyst makes it possible to increase the combustion of carbon monoxide in the regenerator. This is a highly desirable result because the combustion of carbon monoxide not only permits one to reduce the amount of undesirable CO emissions to the atmosphere, but it also provides additional heat directly useful in the cracking operation. The described combustion-promoter metals are effective in amounts which do not adversely affect the selectivity of the cracking process, and have been observed to actually increase gasoline yield. Additionally, it has been found that these metal compounds need not be deposited on the catalyst during catalyst manufacture, but they may be effectively introduced into the circulating inventory of cracking catalyst during operation of the process, as described in U.S. patent application Ser. No. 659,308 filed Feb. 19, 1976 (now U.S. Pat. No. 4,088,568), the entire contents of which are incorporated herein by reference.

Reactivation of supported platinum reforming catalysts by contact with gaseous halogen followed by reduction in hydrogen is disclosed in U.S. Pat. No. 3,134,732 issued May 26, 1964 to Kenneth K. Kearby.

It is an object of the present invention to provide a novel method for augmenting the carbon monoxide combustion activity of a zeolite cracking catalyst that contains a minute amount of combustion-promoter metal which has become deactivated for the combustion of carbon monoxide. It is a further object of this invention to provide a novel method for increasing the carbon monoxide combustion activity of a metal promoted zeolite cracking catalyst. It is a further object of this invention to provide a method of operating a fluid catalytic cracking unit such that a predetermined value for the carbon dioxide to carbon monoxide ratio is achieved in the flue gas discharged from the regenerator. Other objects of this invention will become apparent to those skilled in the art on reading the entire specification hereof including the claims.

BRIEF SUMMARY OF THE INVENTION

It has now been discovered that a zeolite cracking catalyst that contains a minute amount of combustion-promoter metal to promote the combustion of carbon monoxide is advantageously contacted at elevated temperature with elemental chlorine, elemental bromine, a metal-free chlorine compound or a metal-free bromine compound. The effect of this treatment is to increase the carbon monoxide combustion activity of the catalyst.

The effect of the treatment outlined in the foregoing paragraph may be illustrated by way of a simple example. A sample of commercial zeolite cracking catalyst containing 5 parts per million of platinum was preheated to 1400° F in nitrogen and then exposed to saturated steam at atmospheric pressure for 4 hours while maintaining the temperature at 1400° F. The sample of catalyst was then contacted with air at 1240° F, simulating a typical regenerator temperature. After the air treatment at 1240° F, the catalyst was treated for 15 minutes at 1240° F with an air stream flowing at 215 cc/minute and saturated with tert-butyl chloride at 75° F. The effect of the exposure of the steamed catalyst sample to air and tert-butyl chloride in air was assessed by passing nitrogen gas containing 4% CO, 4% $O_2$ and 8% $CO_2$ over the catalyst at 1240° F and measuring the extent of CO oxidation. The results were as follows:

Steamed catalyst: 100% CO oxidized
Air-treated steamed catalyst: 16% CO oxidized
Air and tert-butyl chloride treated steamed catalyst: 92% CO oxidized The foregoing example illustrates the effect of exposure of cracking catalyst to air in the presence and absence of a metal-free chlorine compound. Whereas the reasons for the effect is not understood, there is little question that the presence of tert-butyl chloride, for example, has a remarkable effect in restoring decayed carbon monoxide oxidation activity or, in the alternative, preventing loss of such activity.

The method of this invention may be applied during catalyst manufacture, permitting less concentration of the promoter metal to be used without reduction of carbon monoxide oxidation activity. Or it may be applied to equilibrium catalyst in an FCC unit in any of several ways hereinafter described, without disrupting operation of the FCC process.

SPECIFIC EMBODIMENTS

The FCC catalysts useful in the present invention are those that contain a zeolitic cracking component, such as the catalysts described in U.S. Pat. Nos. 3,140,249 and 3,140,253 issued July 7, 1964. For the purpose of this invention, the zeolitic cracking catalyst is promoted with a minute amount of combustion-promoter metal selected from the group consisting of platinum, palladium, rhodium, ruthenium, osmium and rhenium, said minute amount being sufficient to measurably increase the $CO_2/CO$ ratio in the flue gas from the regenerator preferably to a ratio greater than 3.0, but to a value less than a predetermined desired value. Of the recited combustion-promoter metals, platinum is particularly preferred.

The combustion-promoter metal selected from the above-identified group may be a component of all catalyst particles or of only some of the catalyst particles. In terms of its concentration in the circulating inventory of cracking catalyst, it must be present in sufficient concentration to be able to increase the reaction of carbon monoxide with oxygen to carbon dioxide, as hereinabove described, the conditions in the regenerator being adequate, of course, to support this combustion, e.g., sufficiently high temperature and sufficient air. Yet the metal must not be present in a proportion so large that it substantially adversely affects the operation of the cracking side of the process. This latter, upper limit on metal promoter content is to some extent a reflection of the design capacity of the cracking system including auxiliaries and downstream product resolution facilities compared to actual operating throughput. The upper level of combustion-promoter metal content must be less than that which would cause this design capacity to be exceeded.

In general, the proportion of metal does not exceed about 100 parts per million of the total circulating inventory of catalyst. In particular, for platinum and iridium, the minute amount of CO combustion-promoter metal does not exceed about 10 parts per million of the circulating inventory of catalyst. The expression "parts per million" as used herein means pounds of metal per million pounds of cracking catalyst.

The zeolite cracking catalyst that contains the combustion-promoter metal may be prepared in a catalyst manufacturing plant, i.e., the promoter metal is introduced into the zeolite cracking catalyst before this is charged to the cracking unit. On the other hand, the combustion-promoter metal may be introduced, as hereinabove indicated, into the circulating inventory of fresh or equilibrium catalyst which is already in an FCC unit.

It is to be understood that by the process of the present invention less combustion-promoter metal is used to achieve and/or maintain a predetermined $CO_2/CO$ ratio in the flue gas from the regenerator. This reduced consumption of metal is advantageous cost-wise and has concomitant advantages such as facility of control. These advantages are achieved without constraining the predetermined $CO_2/CO$ ratio, which may be greater than 100 to 1, representing complete combustion, or may be in the range of 5 to 1 to 100 to 1 for partial combustion. The term "increased" or "increasing" as used herein in reference to the carbon monoxide combustion activity produced by the method of this invention is to be broadly construed to signify imparting a combustion activity, as evidenced by the instantaneous or averaged $CO_2/CO$ ratio, that is greater than the ratio obtained with untreated metal-promoted catalyst by at least that amount corresponding to a 10% reduction of the denominator of the latter ratio, i.e. the ratio for untreated metal-promoted catalyst. Thus, the term applies to fresh metal-promoted catalyst when activated by the method of this invention; to periodic treatment to restore activity of metal-promoted catalyst deactivated for carbon monoxide combustion; and to continuous treatment of metal-promoted catalyst to reduce or eliminate the usual loss of activity observed with time on stream.

The compounds that are useful in the present invention to increase the carbon monoxide oxidation activity include elemental chlorine and elemental bromine. However, it is preferred to use a metal-free chloride compound or a metal-free bromine compound. These metal-free compounds may be inorganic, and they include compounds such as hydrochloric acid, hydrobromic acid, ammonium chloride, ammonium bromide, hydrazine hydrochloride, hydrazine hydrobromide, boron trichloride, and silicon tetrachloride. The metal-free compounds that may be used include organic compounds that contain chlorine, bromine, or both, such as methyl chloride, methyl bromide, ethyl chloride, ethyl bromide, ethylene dichloride, propyl chloride and butyl chloride, particularly t-butyl chloride, and other alkyl and olefinic chlorides; chlorinated or brominated aromatic compounds such as chlorobenzene, bromobenzene, polychlorobenzenes, chlorinated biphenyls and brominated biphenyls.

It will be recognized from the foregoing recitation that the compounds useful in this invention include substances that differ in volatility behavior and solubility characteristics. Although all of the above compounds are believed to be effective when contacted at elevated temperature with a metal-promoted zeolite cracking catalyst, certain of these compounds will lend themselves better than other compounds for one of the particular methods of contacting described hereinbelow. By way of illustration, if the contacting is to be done in the regenerator of a fluid catalytic cracking unit, it is preferred to use a volatile compound which is mixed and fed with the air supplied to the regenerator. If the contacting is to be done by addition of the activator in the feed, it is preferred that the activator be soluble in the feed and be such that the chloride or bromide be deposited on the catalyst and carried into the regenerator. In such a case, the activator should have low volatility and high thermal stability, e.g., high molecular weight chlorinated aromatics.

The contacting time and temperature may vary widely in the method of this invention. In general, the advantageous effects of contacting the zeolitic cracking catalyst with the aforementioned compounds may be obtained by contacting at a temperature from about 800° F to about 1400° F, for at least 5 minutes. The actual contacting time may vary considerably, depending upon the particular method of contacting employed.

Fresh zeolite cracking catalyst that contains a metal combustion promoter as hereinabove described may be treated by the method of this invention prior to charging the catalyst to a cracking unit. This may be done by placing the catalyst in a furnace, heating it to a temperature preferably within the range of about 900° F to 1300° F in an atmosphere of oxygen containing gas such as air that contains also the contacting compound. The contacting compound in this instance is preferably a volatile material, such as carbon tetrachloride, or carbon tetrabromide, and should be introduced in an amount effective to induce the desired activation, said amount being from about 0.2 wt.% up to about 5 wt.% of the catalyst. An alternative method for activating the carbon monoxide combustion activity of a fresh catalyst is to impregnate the catalyst with the contacting compound, in an amount as hereinabove described, followed by calcining the catalyst at a temperature in the range of 250° F to 1000° F for a period of at least 5 minutes to 2 hours. In the latter case, the compound may be substantially non-volatile, and may include materials such as chlorinated paraffin. It is preferred to conduct the calcining in an atmosphere of oxygen containing gas, such as air.

It is a feature of the present invention that it may be employed in the FCC process without disrupting the operation of the process. Also, it may be employed in one of two different ways. In the first instance, a circulating inventory of catalyst which has become deactivated with regard to carbon monoxide combustion activity may be treated periodically while in the unit to restore this combustion activity. The activating compounds may be introduced into the FCC unit shown in FIG. 1 with the air fed to the regenerator via conduit 46, or dissolved in the oil feed and passed via conduit 2 to the riser 4, or the compounds may be injected into the unit at numerous points, such as into the disengaging cyclones or the reactor or regenerator, into the spent catalyst transfer conduit 36, into the regenerated catalyst transfer conduit 6, in the stripping stream line 26, or with the dispersion steam. When so introduced, it is preferred to use a metal-free chlorine compound or a metal-free bromine compound, in amount effective to induce the desired activation, said amount being from about 0.2 wt.% up to about 5 wt.% of the circulating inventory of cracking catalyst. This amount is specified, of course, for any single regeneration treatment to restore carbon monoxide combustion activity. The time period over which the compound is introduced may vary from 5 minutes to about 5 hours.

In the described method for periodically restoring the carbon monoxide combustion activity, it is preferred to introduce the metal-free chloride or bromine compound directly into the regenerator, most prferably mixed with the air feed to the regenerator.

As an alternative to periodically restoring the carbon monoxide combustion activity of the circulating inventory of zeolite cracking catalyst, the method of this invention may be used to sustain that activity at a high level by continuously feeding a small amount of one of the enumerated metal-free compounds to the FCC unit. In such instance, it may be assumed that there is a continuous restoration balanced with continuous decay so that a very stable operation is achieved. The means for introducing the chlorine, bromine, or metal-free chloride or bromine compounds into the catalyst section are the same as described hereinabove for the periodic restoration of the carbon monoxide combustion activity. However, when continuously feeding such a compound, the compound should be fed at a rate which is effective to maintain the carbon monoxide combustion activity at a substantially constant level, said rate not to exceed about one part by weight of compound per hundred parts by weight of fresh oil feed.

It is evident that when the method of this invention is applied to the circulating inventory of catalyst in the FCC process, in effect, a novel method of operating the FCC process is achieved.

What is claimed is:

1. In a fluid cracking process for cracking a hydrocarbon feed in the absence of added hydrogen, said process comprising continuously circulating an inventory of zeolitic cracking catalyst between a cracking zone wherein the temperature is higher than 800° F and a regeneration zone wherein the temperature is higher than about 1000° F, contacting said hydrocarbon feed with said zeolitic cracking catalyst in said cracking zone thereby forming cracked products and coked catalyst, separating and passing said coked catalyst to said regeneration zone while feeding an oxygen containing regeneration gas to said regeneration zone thereby regenerating said coked catalyst and producing a flue gas with a $CO_2/CO$ ratio of less than about 2.0, and returning said regenerated catalyst to said cracking zone, the improvement whereby the $CO_2/CO$ ratio is increased to a predetermined value thereby forming a flue gas of reduced carbon monoxide content, which comprises:

including in said circulating inventory of zeolitic cracking catalyst combustion-promoter metal selected from the group consisting of platinum, palladium, rhodium, ruthenium, iridium, osmium and rhenium, in an amount that does not exceed 100 parts per million and that is insufficient to produce a $CO_2/CO$ ratio of said predetermined value;

and, contacting said circulating inventory of metal-promoted catalyst with an amount of elemental chlorine, elemental bromine, a metal-free chlorine compound, or a metal-free bromine compound effective to increase said $CO_2/CO$ ratio to said predetermined value.

2. The improved process described in claim 1 wherein said contacting of said circulating inventory with an amount of elemental chlorine, elemental bromine, a metal-free chlorine compound, or a metal-free bromine compound, is continuous.

3. The improved process described in claim 1 wherein said contacting of said circulating inventory with an amount of elemental chlorine, elemental bromine, a metal-free chlorine compound, or a metal-free bromine compound, is periodic.

4. The fluid catalytic cracking process described in claim 1 wherein said circulating inventory of cracking catalyst is equilibrium catalyst.

5. The fluid catalytic cracking process described in claim 1 wherein said elemental chlorine, elemental bromine, a metal-free chlorine compound, or a metal-free bromine compound is introduced into the regeneration zone.

6. The fluid catalytic cracking process described in claim 1 wherein said elemental chlorine, elemental bromine, a metal-free chlorine compound, or a metal-free bromine compound is introduced into said cracking zone.

7. The fluid catalytic cracking process described in claim 5 wherein said introduction of said compound is effected by mixing with said oxygen-containing regeneration gas.

8. The fluid catalytic cracking process described in claim 6 wherein said introduction of said compound is effected by dissolving it in said hydrocarbon feed.

9. The fluid catalytic cracking process described in claim 7 wherein said compound is tert-butyl chloride.

10. The fluid catalytic cracking process described in claim 8 wherein said compound is a polychlorinated aromatic hydrocarbon.

11. The fluid catalytic cracking process described in claim 5 wherein said combustion-promoter metal is platinum.

12. The fluid catalytic cracking process described in claim 6 wherein said combustion-promoter metal is platinum.

13. The fluid catalytic cracking process described in claim 7 wherein said combustion-promoter metal is platinum.

14. The fluid catalytic cracking process described in claim 8 wherein said combustion-promoter metal is platinum.

15. The fluid catalytic cracking process described in claim 9 wherein said combustion-promoter metal is platinum.

16. The fluid catalytic cracking process described in claim 10 wherein said combustion-promoter metal is platinum.

17. The fluid catalytic cracking process described in claim 1 wherein said regeneration zone is contained within a swirl-type regenerator.

* * * * *